United States Patent
Chang et al.

(10) Patent No.: US 8,948,524 B2
(45) Date of Patent: Feb. 3, 2015

(54) JOINT IMAGE COMPRESSION METHOD AND APPARATUS

(75) Inventors: Cheng Chang, New York, NY (US); Erik Ordentlich, San Jose, CA (US); Krishnamurthy Viswanathan, Mountain View, CA (US); Marcelo Weinberger, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 466 days.

(21) Appl. No.: 13/259,521

(22) PCT Filed: Oct. 29, 2009

(86) PCT No.: PCT/US2009/062653
§ 371 (c)(1),
(2), (4) Date: Sep. 23, 2011

(87) PCT Pub. No.: WO2011/053300
PCT Pub. Date: May 5, 2011

(65) Prior Publication Data
US 2012/0201462 A1   Aug. 9, 2012

(51) Int. Cl.
G06K 9/66 (2006.01)
G06K 9/46 (2006.01)
H04N 19/61 (2014.01)
H04N 19/102 (2014.01)
H04N 19/147 (2014.01)
H04N 19/172 (2014.01)

(52) U.S. Cl.
CPC ............ *H04N 7/50* (2013.01); *H04N 7/26069* (2013.01); *H04N 7/26101* (2013.01); *H04N 7/26154* (2013.01); *H04N 7/26271* (2013.01)

USPC ............................ 382/232; 382/190; 382/236

(58) Field of Classification Search
USPC .................................................. 382/232–253
See application file for complete search history.

(56) References Cited

U.S. PATENT DOCUMENTS

| 5,787,203 | A  | * | 7/1998  | Lee et al. ................... 382/232 |
| 6,226,410 | B1 | * | 5/2001  | O'Rourke .................. 382/232 |
| 7,228,006 | B2 | * | 6/2007  | Stubler et al. .............. 382/286 |
| 7,277,641 | B1 |   | 10/2007 | Gleckman |
| 7,286,689 | B2 | * | 10/2007 | Damera-Venkata et al. . 382/107 |

(Continued)

OTHER PUBLICATIONS

Ali J. Tabatabai et al., ":Motion Estimation Methods for Video Compression—A Review," J. Franklin Inst., vol. 335B, No. 8, 1998m pp. 1411-1441.

(Continued)

*Primary Examiner* — Utpal Shah

(57) ABSTRACT

A joint image compression system and method compress a target image and a reference image under a selected transform to produce a compressed difference image. The joint image compression system includes a computer readable media and a computer program stored on the computer readable media. The computer program includes instructions that implement selecting a transform from among a plurality of transforms that includes a subset determined projective (SDP) transform, where the selected transform minimizes a cumulative mapping error (CME) for corresponding feature points in each of a target image and a reference image. The instructions further implement applying the selected transform to one of the target image and the reference image; forming a difference image under the selected transform and compressing the difference image to produce a compressed difference image.

15 Claims, 3 Drawing Sheets

(56) References Cited

U.S. PATENT DOCUMENTS

| | | | |
|---|---|---|---|
| 7,317,839 B2 * | 1/2008 | Holcomb | 382/236 |
| 8,019,169 B2 * | 9/2011 | Kondo | 382/236 |
| 8,094,049 B2 * | 1/2012 | Sekiguchi et al. | 341/107 |
| 8,126,282 B2 * | 2/2012 | Jung et al. | 382/238 |
| 8,249,340 B2 * | 8/2012 | Monga et al. | 382/166 |
| 8,326,021 B2 * | 12/2012 | Kobayashi et al. | 382/154 |
| 8,639,025 B2 * | 1/2014 | Kobayashi et al. | 382/154 |
| 2004/0022436 A1 * | 2/2004 | Patti et al. | 382/191 |
| 2004/0175050 A1 | 9/2004 | Boon | |
| 2007/0040848 A1 | 2/2007 | Hutchinson et al. | |
| 2007/0260137 A1 | 11/2007 | Sato et al. | |
| 2008/0267516 A1 * | 10/2008 | Chang et al. | 382/236 |

OTHER PUBLICATIONS

Samy Ait-Aoudia et al., "A Comparison of Set Redundancy Compression Techniques," EURASIP J. Appl. Sig. Proc., vol. 2006, Article ID 92734, 2006, pp. 1-13.

* cited by examiner

JOINT IMAGE COMPRESSION METHOD AND APPARATUS

CROSS-REFERENCE TO RELATED APPLICATIONS

N/A

STATEMENT REGARDING FEDERALLY SPONSORED RESEARCH OR DEVELOPMENT

N/A

BACKGROUND

Popularity and use of digital cameras and similar digital imaging devices (e.g., scanners) has increased in recent years as prices have fallen and image quality has improved. Among other things, digital cameras provide a user with an almost instantly viewable photographic image. Furthermore, digital cameras as well as scanners generally capture and store images in a native digital format. The native digital format may facilitate image distribution following an upload of the images from the digital camera to one or both of an archival storage and an image processing system such as a personal computer (PC). Similarly, once uploaded the digital images are easily stored for later retrieval.

However, concomitant with the rapid adoption and proliferation of digital photography, and more generally with the nearly universal acceptance and use of digital formats for archival image storage, has come an increased pressure on storage resources and media. In particular, image compression has become an important tool for dealing with storing and managing the vast amount of data associated with such digital images.

In general, image compression is performed one image at a time with each compressed image representing just a single image. Examples of commonly used, single image-based image compression include Joint Photographic Experts Group (JPEG) and JPEG 2000 compression standards. Another well-known, single image-based image compression technique is Lempel-Ziv-Welch (LZW) lossless data compression used to compress bitmap images using the Graphics Interchange Format (GIF). However, while efficient for producing compressed images, single image-based image compression may not produce the smallest or most compressed representation of a set of images, especially when the images are similar to one another. In particular, single image-based image compression simply cannot take advantage or otherwise exploit data redundancy that may exist in a set of similar images.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

Figure 1:
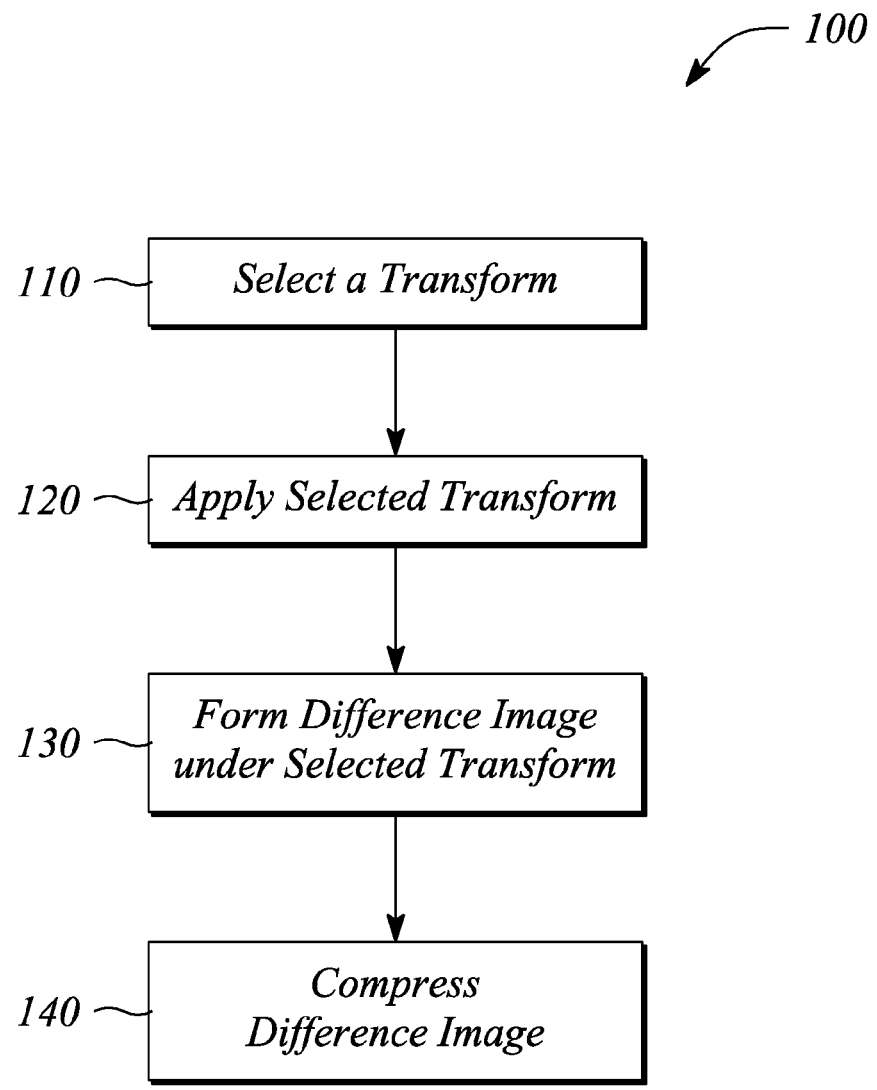
FIG. 1 illustrates a flow chart of a method of joint image compression, according to an embodiment of the present invention.

Certain embodiments of the present invention have other features that are one of in addition to and in lieu of the features illustrated in the above-referenced figures. These and other features of the invention are detailed below with reference to the preceding drawings.

DETAILED DESCRIPTION

Embodiments of the present invention provide joint compression of similar images that exploits image similarity to facilitate image compression. In particular, embodiments of the present invention employ a difference between the similar images to substantially reduce an information redundancy that is inherent in a combination of the similar images. Data used to represent an image is directly related to an amount of information in the image. By reducing the inherent information redundancy, a total amount of data associated with the similar images is likewise reduced providing a joint compression of the similar images. As a result of this joint compression according to embodiments of the present invention, the similar images may be one or both of stored using less memory and transmitted using less bandwidth when compared to the memory or the bandwidth that would have been required for the original (uncompressed) similar images, for example. Likewise, less memory and less bandwidth may be required when the joint compression according to embodiments of the present invention is compared to separately compressing the similar image using conventional compression approaches. Moreover, embodiments of the present invention are compatible with many existing compression methodologies. Hence, embodiments of the present invention may be readily combined with existing image compression systems to facilitate further total data reduction for storage, transmission and similar applications that may benefit from data redundancy reduction.

Embodiments of the present invention form a difference image from a target image that is being compressed and a reference image. The difference image represents a difference between the target image and the reference image. According to various embodiments, the target image and the reference image are similar images and therefore have some level of redundancy in terms of an amount of information in, or an amount of information that is represented by, a combination of similar images. The difference image substantially captures only the difference between the images and therefore lacks the redundancy of the combination of similar images. In particular, the difference image has less information and thus requires less data to represent that information than either of the target image or the reference image. Thus, a total amount of data used to represent a combination of the reference image and the difference image, for example, is reduced when compared to the total amount of data representing the original target and reference images, in combination. The data representing the original target image, or more particularly the combination of the target image and the reference image, is compressed by representing the similar images as the difference image and the reference image.

However, while achieving data compression jointly for the target image and the reference image, no information is lost in forming the difference image according to the joint compression embodiments of the present invention. In particular, forming the difference image reduces the total amount of data representing the original target and reference images in a substantially lossless manner. The original target image may be completely reconstructed from (i.e., decompressed using) the information contained in the difference image and the reference image. By combining the difference image and the reference image in a manner that is the inverse of that used to form the difference image, the target image may be completely reconstructed. In some embodiments, further compression of the difference image and the reference image may be employed. In various embodiments, the further compression may be one of lossless compression and lossy compression. While lossless compression explicitly preserves the lossless nature of the joint compression embodiments of the present invention associated with forming the difference image, lossy compression may still facilitate acceptable reconstruction of the target and reference images, according to some embodiments.

A plurality of target images, each being similar to a reference image, may be jointly compressed, according to some embodiments of the present invention. In particular, the plurality of target images may be jointly compressed by forming a plurality of difference images using the reference image. The plurality of difference images may then be stored or transmitted along with the reference image. Using the reference image and the plurality of difference images, original ones of the plurality of target images may be reconstructed or decompressed.

According to various embodiments, an image transform or simply a 'transform' is employed during the joint compression prior to forming the difference image. The employed transform reduces the difference between the target image and the reference image when applied to the similar images. By reducing the difference between the already similar images, a data size of the formed difference image may be reduced. In particular, the transform adjusts or transforms one or both of the target image and the reference image to reduce the difference between the similar images. For example, the transform may be applied to the reference image to make the reference image more similar to the target image.

In some embodiments, the transform comprises one or more of a projective transform, an affine transform and a bilinear transform. Transforms such as these may be used to account for or describe changes in a visual perspective between two 2-dimensional (2-D) images of a similar subject or scene comprising generally 3-dimensional (3-D) objects. For example, a projective transform may describe a difference between a first 2-D photograph of a set of 3-D objects taken from a first location and a second 2-D photograph taken from a second location that is offset from the first location (e.g., shifted to the right and closer to the 3-D objects). Similarly, these transforms may be used to describe differences in similar images arising from coordinate rotations and scale changes (e.g., image magnification or zoom). As employed according to some embodiments of the present invention, the transform(s) may be chosen to account or compensate for changes in visual perspective that may be present in the similar images. Information about the transform, such as the type of transform and transform parameters, may be included with the difference image (e.g., when storing or transmitting) to facilitate decompression and reconstruction of the similar images at a later time, for example.

In general, the transform is defined by a transform type (e.g., as a projective transform, an affine transform, etc.) and transform parameters for that transform type. When starting with an image and generating a transformed image, the transform parameters for a given transform or transform type may be a priori known or arbitrarily determined. However, given two similar images according to embodiments of the present invention, the transform parameters of a given transform type are determined by comparing the images and determining the parameters based on the comparison. In particular, herein the transform parameters are determined for a given transform type by comparing the target image and the reference image.

In various embodiments, the transform parameters are determined in a manner that seeks to minimize an error in a mapping between points in the target image and the reference image. In some embodiments, the transform parameters are determined such that a cumulative square error in the mapping of point locations is minimized. By 'cumulative' it is meant that a sum of the square error between mapped point locations and the corresponding point locations over all of the points is minimized. Further, by 'minimized' when used with respect to cumulative square error it is meant that a value of the cumulative square error is at least less than another value of the cumulative square error for another set of transform parameters. As such, the term 'minimized' may or may not refer to a global minimum or a smallest value that is ultimately possible.

In some embodiments, the cumulative square error in the mapping and for a given transform may be minimized by determining transform parameters according to an optimization. Any of a number of optimization methodologies may be employed. For example, a random search or a Monte Carlo optimization may be employed. In a random search, a large number of candidate sets of transform parameters is randomly selected. The cumulative square error is computed for each of the candidate sets and a candidate set that provides a smallest cumulative square error is selected as the 'optimum' set of transform parameters that minimize the cumulative square error in the mapping. Other optimization methodologies include, but are not limited to, genetic algorithms, a gradient search, and related optimizations.

Similar images, according to some embodiments of the present invention, are generally images of natural scenes. That is, the images are of objects that are not known a priori as opposed to computer-generated images where the objects in the images are predefined within the computer. As such, some embodiments of the present invention may employ feature point extraction and feature point matching to identify corresponding objects in similar images. The feature points are simply a set of corresponding points in each of the similar images. The transform employed may define a relationship between the feature points in a first similar image and corresponding feature points in a second similar image.

Feature points may be extracted from images using substantially any extraction methodology. For example, feature points may be extracted using a Scale Invariant Feature Transform (SIFT). SIFT is described by David G. Lowe, "Object recognition from local scale-invariant features," Proceedings of the International Conference on Computer Vision 2, 1999, pp. 1160-1157. In another example, feature points in similar images may be extracted manually. In particular, the images may be examined and the feature points in each of the target image and the reference image may be identified and located. For example, a feature point may be identified as a tip of a tower within the similar images. Another feature point may be a corner of a window in the tower, for example.

Feature points are matched by identifying corresponding feature points in each of the target image and the reference image and establishing the location of the corresponding feature point in each of the similar images. The feature point location may be determined in terms of a pixel location in each of the images defined according to an arbitrary coordinate system, for example (e.g., an x-y coordinate of a pixel in each of the similar images that contains the feature point). Considering the above-described similar images of a tower, the exemplary feature point associated with the top of the tower in the target image may be at a pixel given by $x_1=50$ and $y_1=128$. In the reference image, the corresponding feature point for the top of the tower may be located at the pixel given by $x_2=52$ and $y_2=120$. The matching of feature points merely establishes the relationship between the pixels (i.e., between $x_1$, $y_1$ and $x_2$, $y_2$). Feature point matching may employ random sample consensus (RANSAC), for example.

According to various embodiments of the present invention, similar images (i.e., the target image or images and the reference image) are defined as images of related scenes or a related set of objects (e.g., 3-D objects). In particular, the term 'similar' with respect to subject images may be defined as images that share a substantial amount of information. A degree of similarity under the transform employed is not particularly relevant to some embodiments of the present invention, except that the more similar two similar images are the more compressible the difference image is likely to be. In other words, the degree of similarity merely establishes a degree by which the similar images may be compressed according to some embodiments of the present invention. Moreover, compressibility may be adversely affected by a mismatch or misalignment between similar images. In particular, two images may be very similar but far from readily compressible because the mismatch or misalignment between the images is not properly accounted for. The transform, according to various embodiments of the present invention, may account for the mismatch or misalignment of the similar images.

For example, a first similar image may be a photograph of a bowl of fruit. A second similar image may be a photograph of the same bowl of fruit with an added apple. The first and second exemplary similar images may be taken from an identical location with identical magnification or zoom settings. In the example, the first image and the second image of the fruit bowl may differ only in terms of the presence or absence of the apple. As such, except for the apple and anything that the apple may be blocking, the first and second images in the example are substantially identical. The difference between the images is focused on the apple and its particular location in the images, for example. As such, the first and second images are 'similar images' and the difference image is highly compressible compared to the first and second images.

In another example, the first similar image and the second similar image may be each photographs of an automobile in a driveway. However, the first similar image in this example may have been taken from a vantage point at the end of the driveway while the second similar image may be a photograph taken from a location that is not at the end of the driveway (e.g., from a walkway that leads up to a house at which the automobile is parked). The difference between these exemplary images is substantially confined to a change in perspective. Under an appropriate transform that theoretically accounts for all of the perspective change, the difference image may be extremely compressible to substantially zero in size. Only the parameters that define the transform are needed to reconstruct the second similar image from the first similar image, for example.

In yet another example, the first similar image may be a photograph of a military jet with a missile ready for launch while the second similar image is a photograph of the military jet and the missile just after the missile is launched. In addition to the missile having been launched, the second similar image may differ from the first similar image in this example in that the military jet may have moved a little farther forward and away from a location or photographic platform from which the image had been taken. In this example, the military jet, the missile and the perspective of the images have changed. However, the only real change in the objects of the images is the location of the missile and the fact that it has been launched (e.g., rocket exhaust may be present). As such, under a transform that accounts for the perspective differences produced by the differences in the relative locations of the military jet and the photographic platform, the difference image under the transform is still likely to be much more compressible than the similar images themselves.

In yet another example, the first similar image may be a photograph of a bell tower taken from a distance while the second similar image is a photograph of the same bell tower taken from a location that is not as far away from the bell tower as the first similar image. Both a perspective of the bell tower and objects in a foreground (e.g., people) and a background (e.g., birds or clouds) around the bell tower may have changed between the first and second similar images in this exemplary set of similar images. However, the two images are similar in that they share much of the same information (e.g., the bell tower). However, the difference image will include the changes in the foreground and background while the transform or parameters thereof may account for most or all of the perspective shift represented by the second exemplary image with respect to the first exemplary image.

A projective transform, as used herein, is defined in the conventional sense as a geometric transform that describes a perceived change in positions and shapes of observed 3-D objects represented in a 2-D projection of the objects when a location or point of view of an observer changes. In particular, as used herein, the projective transform describes a change in the positions and shapes of 3-D objects in an image when a location from which the image is taken is changed. Mathematically, the projective transform is given by equation (1)

$$\begin{bmatrix} P_X \\ P_Y \\ P \end{bmatrix} = \begin{bmatrix} a_{1,1} & a_{1,2} & a_{1,3} \\ a_{2,1} & a_{2,2} & a_{2,3} \\ a_{3,1} & a_{3,2} & a_{3,3} \end{bmatrix} \cdot \begin{bmatrix} X_1 \\ Y_1 \\ 1 \end{bmatrix} \quad (1)$$

$$\begin{bmatrix} X_2 \\ Y_2 \end{bmatrix} = \begin{bmatrix} P_X/P \\ P_Y/P \end{bmatrix}$$

where $X_1$, $Y_1$ are points in a first image, $X_2$, $Y_2$ are corresponding points in a second or projected image, and $a_{i,j}$ are transform parameters of the projective transform between the first image and the second image. Terms $P_x$, $P_y$ and $P$ in equation (1) are "transformed homogeneous coordinates".

A subset determined projective (SDP) transform, lacking an accepted definition in the art, is defined herein as a projective transform that either employs, may be estimated from, or is otherwise defined by a subset of feature points instead of all of the available feature points extracted from the similar images. In particular, a relatively small subset of feature points available in the similar images (i.e., target image and reference image) is employed in determining a specific SDP transform. For example, the SDP transform may be computed using a subset comprising 4 feature points (i.e., a 4-tuple) from the similar images. In another example, the subset comprises 6 feature points. In yet another example, the subset comprises more than 4 feature points but less than 10 feature points. In yet another example, the subset used to determine the SDP transform may comprise more than 10 feature points but less than about half of the feature points in a set of feature points for the similar images. Computing or determining the SDP transform may employ a minimization of a cumulative square error, especially when more than 4 feature points are involved, for example.

In some embodiments, the feature points are chosen at random from among the available feature points in the set. For example, an SDP transform may be determined from a randomly selected subset of feature points (e.g., 4 feature points) from the available set of feature points. A second SDP transform may then be determined from a randomly selected subset of feature points while a third SDP transform may be determined from yet another randomly selected subset, and so on. Selection of different subsets of feature points from among the available feature points in the set allows a plurality of SDP transforms to be determined for the similar images.

An affine transform, as used herein, is defined in the conventional sense as a transform given by equation (2)

$$\begin{bmatrix} X_2 \\ Y_2 \end{bmatrix} = \begin{bmatrix} a_{1,1} & a_{1,2} \\ a_{2,1} & a_{2,2} \end{bmatrix} \cdot \begin{bmatrix} X_1 \\ Y_1 \end{bmatrix} + \begin{bmatrix} b_1 \\ b_2 \end{bmatrix} \quad (2)$$

where $X_1$, $Y_1$ are points in a first image, $X_2$, $Y_2$ are corresponding points in a second or transformed image, and variables $a_{i,j}$ and $b_i$ are transform parameters of the affine transform between the first image and the second image.

Further, as used herein, the article 'a' is intended to have its ordinary meaning in the patent arts, namely 'one or more'. For example, 'a transform' means one or more transforms and as such, 'the transform' means 'the transform(s)' herein. Also, any reference herein to 'top', 'bottom', 'upper', 'lower', 'up', 'down', 'front', back', 'left' or 'right' is not intended to be a limitation herein. Moreover, examples herein are intended to be illustrative only and are presented for discussion purposes and not by way of limitation.

FIG. 1 illustrates a flow chart of a method 100 of joint image compression, according to an embodiment of the present invention. The method 100 of joint image compression produces a compressed difference image from a target image or image being compressed and a reference image. The target image and the reference image are 'similar images,' as defined above, and may be referred to as such herein. The compressed difference image is generally smaller than either of the target image or the reference image compressed independently. The compressed difference image may be one or more of stored in memory of an image processor, stored in another memory, and displayed on a display device after decompression.

The method 100 of joint image compression comprises selecting 110 a transform from among a plurality of transforms. The transform is selected to minimize a cumulative mapping error (CME) for corresponding feature points in each of the target image and the reference image. The plurality of transforms comprises a subset determined projective (SDP) transform. In some embodiments, the plurality of transforms further comprises an affine transform.

In some embodiments, the plurality of transforms comprises a plurality of SDP transforms, estimated or computed from different subsets of randomly selected feature points. In some embodiments, the selected 110 transform is a SDP transform of the plurality of SDP transforms that yields a smallest CME. In some of these embodiments, the different subsets of randomly selected feature points each comprise four feature points. Employing four feature points in the plurality of SDP transforms generally enables use of a relatively low-complexity algorithm for determining individual SDP transforms of the plurality. In particular, an exact mapping (e.g., zero error) of the four feature points exists to yield a zero mapping error of the SDP transform, at least with respect to the four feature points. That is, given that four feature points are employed, there exists at least one projective transform that exactly maps four feature points of the reference image into a corresponding four feature points of the target image. In other embodiments, more than four feature points are employed, albeit with a concomitant increase in a complexity of the algorithm for determining the SDP transforms of the plurality.

For example, a first subset of four feature points may be chosen at random from a set of feature points in the reference image. A first SDP transform is then determined that maps the chosen subset of four feature points into a corresponding subset of four feature points in the target image. The determined first SDP transform is defined by computed transform parameters that minimize the mapping error for the first subset of four feature points, for example. A cumulative mapping error (CME) is then computed for the feature points according to the determined first SDP transform. In some embodiments, all of the feature points are employed to compute the CME. In other embodiments, only a selected subset of the feature points is used in the CME computation. The example continues by choosing a second subset of four feature points, determining a second SDP transform having transform parameters that minimize the mapping error for the second subset of four feature points, and computing a CME for the all of the feature points according to or under the second SDP transform. Additional SDP transforms and associated CME for those additional SDP transforms are similarly determined and computed using additional randomly selected subsets of four feature points to provide a plurality of SDP transforms, where each SDP transform of the plurality has an associated CME computed for all feature points. The SDP transform of the plurality having the smallest CME is then identified. In some embodiments, the identified SDP transform is the selected transform of selecting 110 a transform.

In general, the plurality of SDP transforms may comprise any number of SDP transforms and as such, may involve any number of randomly selected subsets of feature points. However, in practice, a number of different SDP transforms (or equivalently a number of different feature point subsets) is limited to a reasonable number. For example, the plurality may comprise less than about fifty (50) different SDP transforms using 50 different random selections of feature point subsets. In another example, the plurality may comprise about ten (10) different SDP transforms. In yet another example, the plurality may comprise more than 10 but less than about 20 different SDP transforms.

In some embodiments, the number of SDP transforms in the plurality is chosen arbitrarily. In other embodiments, an optimization methodology may be employed to decide a number of SDP transforms in the plurality. For example, when an optimization methodology is employed, a smallest CME of the SDP transforms in the plurality may be observed to converge to a particular value or limited range of values. When such a convergence is observed, adding SDP transforms will not likely yield significantly smaller CMEs. As such, the number of SDP transforms in the plurality may be chosen at the point when convergence occurs.

In some embodiments, the plurality of transforms further comprises an affine transform that minimizes the CME. In some embodiments, selecting 110 a transform comprises selecting either the SDP transform or the affine transform depending on which one provides a smaller CME. In some of these embodiments, the SDP transform is the identified SDP transform of the plurality of SDP transforms mentioned above.

For example, a plurality of SDP transforms using randomly selected subsets of feature points may be determined and corresponding CMEs for each of the SDP transforms of the plurality may be computed. An SDP transform of the plurality providing a smallest CME is then identified. An affine transform that minimizes a CME for the target image and the reference image is determined along with the minimized CME of the affine transform. Such an affine transform can be computed by solving a convex optimization problem and any convex optimization algorithm can be used for this purpose, according to some embodiments. The CME of the identified SDP transform is then compared with the CME for the affine transform. If the CME of the identified SDP transform is smaller than the CME of the affine transform, then the identified SDP transform is selected 110 as the selected transform. Otherwise, the affine transform is the selected 110 transform.

The method 100 of joint image compression further comprises applying 120 the selected transform to an image of the similar images to produce a transformed image. In particular, in some embodiments, the selected transform is applied 120 to the reference image to produce a transformed reference image. For example, if the reference image is represented by R and the transform is denoted $T(\cdot)$, then the transformed reference image produced by applying 120 the selected transform may be denoted $T(R)$. In other embodiments, the selected transform is applied 120 to the target image to produce a transformed target image. For example, if the target image is represented by I and the transform is denoted $T(\cdot)$, then the transformed target image produced by applying 120 may be denoted $T(I)$.

In some embodiments, applying 120 may comprise first applying the selected transform image being transformed to obtain a transformed image and then employing an interpolation to obtain transformed pixel values at integer-valued coordinates of the transformed image. In particular, the pixels of the image being transformed all have integer-valued pixel coordinates. Applying the selected transform to the pixels of the image being transformed may produce transformed pixels at non-integer valued coordinates in the transformed image. Transformed pixel values at integer-valued pixel coordinates within the transformed image may be obtained by interpolating values of the transformed pixels having transformed coordinates that fall within a neighborhood about an integer-valued coordinate. After interpolation, the transformed image is completely represented by pixels with integer-valued pixel coordinates.

The method 100 of joint image compression further comprises forming 130 a difference image under the selected transform. In some embodiments, the difference image is formed 130 using an image processor. The difference image represents a difference between the target image and the reference image once the selected transform has been applied 120 to the respective images. In particular, forming 130 a difference image produces a difference of the transformed image (i.e., transformed reference image $T(R)$ or transformed target image $T(I)$) and an original or untransformed image (i.e., target image I or reference image R). The difference may be a pixel-by-pixel subtraction of the target image and the reference image under the transform, for example.

According to various embodiments, images referred to herein may be represented by an alphabet in bits per pixel (bpp). In some embodiments, an alphabet size used to represent pixels in the difference image may be changed as a result of taking the difference on a pixel-by-pixel basis during forming 130 a difference image. For example, when the target and reference images are represented by an 8 bpp alphabet, forming 130 a difference image may result in the pixel values of the difference being represented by 9 bits (i.e., a 9 bpp alphabet). In other embodiments, the alphabet size of the difference image produced by forming 130 a difference image need not be changed from that of the target and reference images under the transform. For example, given an 8 bpp alphabet size before forming 130 a difference image, a modulo-256 difference or subtraction may be employed such that the resultant difference image also has an 8 bpp alphabet. In such embodiments, an efficiency of subsequent compression may be enhanced.

For example, forming 130 the difference image may comprise subtracting the transformed reference image $T(R)$ from the target image I. In another example, forming 130 the difference image may comprise subtracting the transformed target image $T(I)$ from the reference image R. In yet other examples, the untransformed target image I or untransformed reference image R is subtracted from the respective ones of the transformed reference image $T(R)$ and the transformed target image $T(I)$ to form 130 the difference image.

The method 100 of joint image compression further comprises compressing 140 the difference image to produce a compressed difference image. In some embodiments, the compressed difference image produced by compressing 140 may be one or more of stored in memory of a computer or an image processor that implements the method 100 of joint image compression, stored in another memory, and displayed on a display device after decompression and reconstruction. For example, the compressed difference image may be stored along with the reference image in archival memory. The target image may be reconstructed at a later time after storage from the stored compressed difference image, the stored reference image, the selected transform and the associated stored transform parameters.

Compressing 140 the difference image may be performed by an image compressor, according to some embodiments. The image compressor may be either a hardware image compressor or a software image compressor. For example, compressing 140 the difference image may be performed by either a hardware-based or a software-based image compressor that implements one of Joint Photographic Experts Group (JPEG) or JPEG 2000 compression. In another example, compressing 140 the difference image may employ one of JPEG-LS, Lempel-Ziv-Welch (LZW) lossless data compression, Golomb coding, Huffman coding, and arithmetic coding implemented either in hardware or software. In yet other examples, techniques including, but not limited to, run-length encoding, entropy encoding, and predictive encoding that are adapted to image compression may be employed.

In other embodiments, compressing 140 the difference image may employ other data compression techniques that are not necessarily adapted to image compression. Moreover, compressing 140 the difference image may employ either lossless compression or lossy compression. In general, any of these other techniques may be implemented either as a hardware-based compressor or a software-based compressor for compressing 140 the difference image.

Since substantially any data compression technique, whether or not adapted to image compression, may be employed in compressing 140 the difference image to produce the compressed difference image, herein the terms 'compression' or 'compressing' and 'image compression' or 'image compressing' are used interchangeably unless a distinction is necessary for proper understanding. Moreover, by removing the redundancy associated with a similarity between the target image and the reference image, some embodiments of the present invention may improve an overall amount of compression when compared to the compression technique alone, whether or not the data compression technique is specifically adapted to image compression.

In some embodiments, compressing 140 the difference image further compresses parameters of the selected transform and associates the compressed parameters with the compressed difference image. For example, the transform parameters and the transform type of the selected transform T(•) may be encoded and compressed 140 along with the difference image. Similarly, the reference image or the transformed reference image may be compressed during compressing 140 the difference image. Storing the transform parameters, the transform type and the reference image in compressed form along with the compressed difference image facilitate decompression of the target image while representing a compact means of storing all of the information necessary for decompression.

Figure 2:
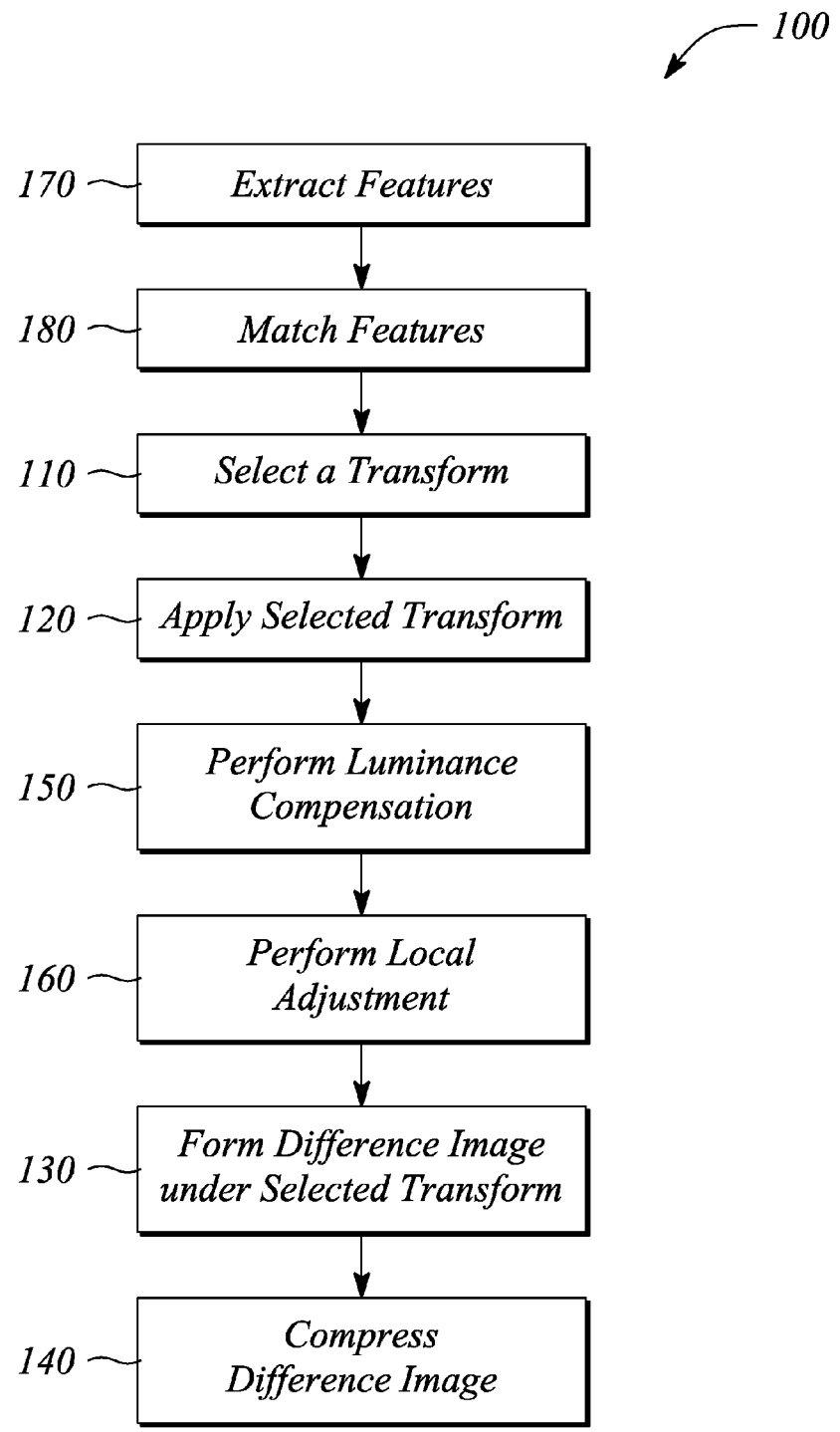
FIG. 2 illustrates a flow chart of a method of joint image compression, according to another embodiment of the present invention.

FIG. 2 illustrates a flow chart of a method 100 of joint image compression, according to another embodiment of the present invention. The embodiment of the method 100 of joint image compression in FIG. 2 comprises selecting 110 a transform, applying 120 the selected transform, forming 130 a difference image and compressing 140 the difference image, as described above with respect to FIG. 1. As further illustrated in FIG. 2, the method 100 of joint image compression further comprises performing 150 luminance compensation of the target image and the reference image under the selected transform. In particular, according to some embodiments, luminance compensation is performed 150 after applying 120 the selected transform but prior to forming 130 the difference image. For example, luminance compensation may be performed 150 on the target image I and the transformed reference image T(R) after the selected transform has been applied 120. In another example, luminance compensation may be performed 150 on the reference image R and transformed target image T(I).

In performing 150 luminance compensation, a luminance of a pixel in a first image (e.g., the target image) is compared to a luminance of a corresponding pixel in a second image (e.g., the transformed reference image). A difference in the compared luminance is determined and then reduced. For example, performing 150 luminance compensation may find parameters a and b that minimize equation (3)

$$\operatorname*{argmin}_{a,b} \sum_i (aK_i + b - J_i)^T (aK_i + b - J_i) \quad (3)$$

where J, K represent color channels (e.g., the y, cb, cr channels of an image using a YCbCr color space representation) of pixels in a first image (e.g., target image) and a second image (e.g., transformed reference image) respectively indexed on integer i, a function 'arg min' finds a minimum of its argument over the parameters a and b, and 'T' indicates a transpose. A minimization according to the 'arg min' function may compute values of the parameters a and b that minimizes the summation over all pixels as expressed by equation (3). In some embodiments, the minimization may ignore the so-called chrominance channels, cb and cr, and employ only a luminance component y of the YCbCr color space representation. In general, the minimization may be performed according to any minimization technique or more generally by any optimization methodology that may yield a minimum.

Luminance is a measure of a luminous intensity in an image. Luminance compensation may compensate for differences in lighting between the target image and the reference image, for example. A compensated image after performing 150 luminance compensation according to equation (3) is produced by replacing each pixel value $K_i$ in an original or uncompensated image by a compensated pixel value given by $aK_i+b$, where parameters a and b result from the minimization, for example.

Referring again to FIG. 2, in some embodiments, the method 100 of joint image compression further comprises performing 160 local adjustment of the selected transform. Performing 160 local adjustment comprises partitioning the target image into sub-image regions or blocks. Sub-image regions or blocks are blocks of generally contiguous pixels that are smaller than the whole image. In other words, the sub-image block represents a contiguous subset of pixels from the set of pixels comprising the image where the subset has fewer pixels than the set. Performing 160 local adjustment further comprises tuning or adjusting the selected transform to further reduce the CME of the transform on a block-by-block basis. Specifically, for each block, the selected transform is tuned to further reduce the CME between feature points belonging to the block and the transformed corresponding feature points in the reference image.

In some embodiments, tuning comprises computing an affine transform for each block of the target image such that the affine transform along with the selected transform (i.e., successive applications of the transforms) minimizes a CME between a composed transformation of feature points in the reference image and corresponding feature points in the target image. Alternatively, tuning comprises computing an affine transform for each block of the target image such that the affine transform along with the selected transform (i.e., successive applications of the transforms) minimize a squared error between pixel values in a composed transformation of the reference image pixel values and the target image pixel values in the block. The computation for both embodiments can involve a search over a finite set of affine transform parameters close to an identity transform (e.g., where the $a_{i,j}$ matrix in equation (2) is the identity and the b vector is 0). The local adjustment can also be combined with a local adjustment of the luminance parameters as well to minimize equation (3) but with the sum confined to pixels in a respective target image block. An iterative process may be carried out to jointly optimize the local luminance and local affine transform parameters. For example, in a first iteration of the iterative process, luminance parameters may be fixed and the affine transform parameters may be optimized, as above. In a second iteration of the iterative process, the luminance parameters may be optimized, while keeping the affine transform parameters fixed to the values in the first iteration, for example. This process can be repeated for some number of iterations, each time fixing one set of parameter values and optimizing the other, for example. In general, it is noted that the minimization for computing the local affine transform is a convex optimization problem and any of several algorithms may be employed to perform the minimization.

Referring again to FIG. 2, in some embodiments, the method 100 of joint image compression further comprises extracting 170 feature points and matching 180 the extracted feature points to locate and identify corresponding feature points in each of the target image and the reference image. In some embodiments, extracting 170 and matching 180 are performed before selecting 110 a transform.

In some embodiments, extracting 170 feature points comprises computing a set of feature points or coordinates within the target image and the reference image and determining associated descriptors for the feature points using the Scale Invariant Feature Transform (SIFT). In other embodiments, another technique may be employed to extract 170 feature points. For example, the feature points may be extracted manually. In yet another example, an edge-detection may be performed and feature points associated with detected edges are extracted.

Matching 180 the extracted feature points establishes a relationship between corresponding feature points in each of the target image and the reference image. Matching 180 the extracted feature points may employ substantially any method of associating corresponding feature points including, but not limited to, manual association and automatic association.

Figure 3:
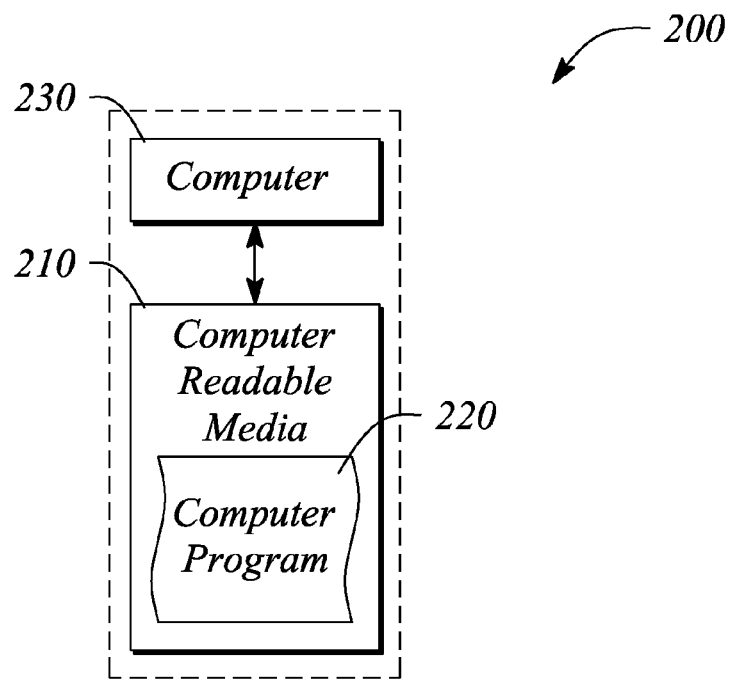
FIG. 3 illustrates a block diagram of a joint image compression system according to an embodiment of the present invention.

FIG. 3 illustrates a block diagram of a joint image compression system 200 according to an embodiment of the present invention. In some embodiments, the joint image compression system implements or realizes the method 100 of joint image compression. In particular, the joint image compression system comprises a computer readable media 210. As used herein, the term 'computer readable media' is defined as tangible media and explicitly excludes signals, carrier waves and the like that constitute transient or non-tangible media. Herein, the term 'media' explicitly includes the singular 'medium'. In general, computer readable media may be any means for physically storing data for later retrieval. As used herein, 'physically storing' is defined as producing a change in a physical medium such that the change can be detected (e.g., read) at a later time.

Examples of computer readable media 210 include, but are not limited to, random access memory (RAM), read-only memory (ROM), computer hard drives (HD), removable media drives (e.g., floppy drives), optical drives (e.g., CD/ROM, DVD, etc.), and various related thumb drives. Other examples may include, but are not limited to, application specific integrated circuits (ASICs) and discrete logic that is configured to record data and computer instructions being stored.

The computer readable media 210 may be local to a computer, in some embodiments. For example, the computer readable media may be a DVD that is inserted into and read using a DVD drive of the computer. In another example, the computer readable media may be RAM (e.g., memory) of the computer. In other embodiments, the computer readable media 210 may be remote from a computer that reads the computer readable media. For example, the computer readable media may be a hard drive on a server that is accessed using the Internet with a computer that reads the computer readable media.

The joint image compression system 200 further comprises a computer program 220 stored on the computer readable media 210. For example, the computer program 220 may be written onto the computer readable media for storage and later execution. The computer program 220 stored on the computer readable media 210 comprises instructions that implement selecting a transform from among a plurality of transforms comprising a subset determined projective (SDP) transform, the selected transform minimizing a cumulative mapping error (CME) for corresponding feature points in each of a target image and a reference image; forming a difference image under the selected transform; and compressing the difference image to produce a compressed difference image. In some embodiments, the instructions substantially implement the method 100 of joint image compression as described in more detail above.

In some embodiments, the joint image compression system 200 further comprises a computer 230 that reads the computer readable media 210. In some embodiments, the computer 230 may be a general-purpose computer comprising a processor. The processor may be a microprocessor, for example. In other embodiments, the computer 230 may be a special-purpose computer such as, but not limited to, a graphics processor and an image processor. In yet other embodiments, the special-purpose computer may comprise an application specific integrated circuit (ASIC) or discrete logic circuits.

Figure 4:
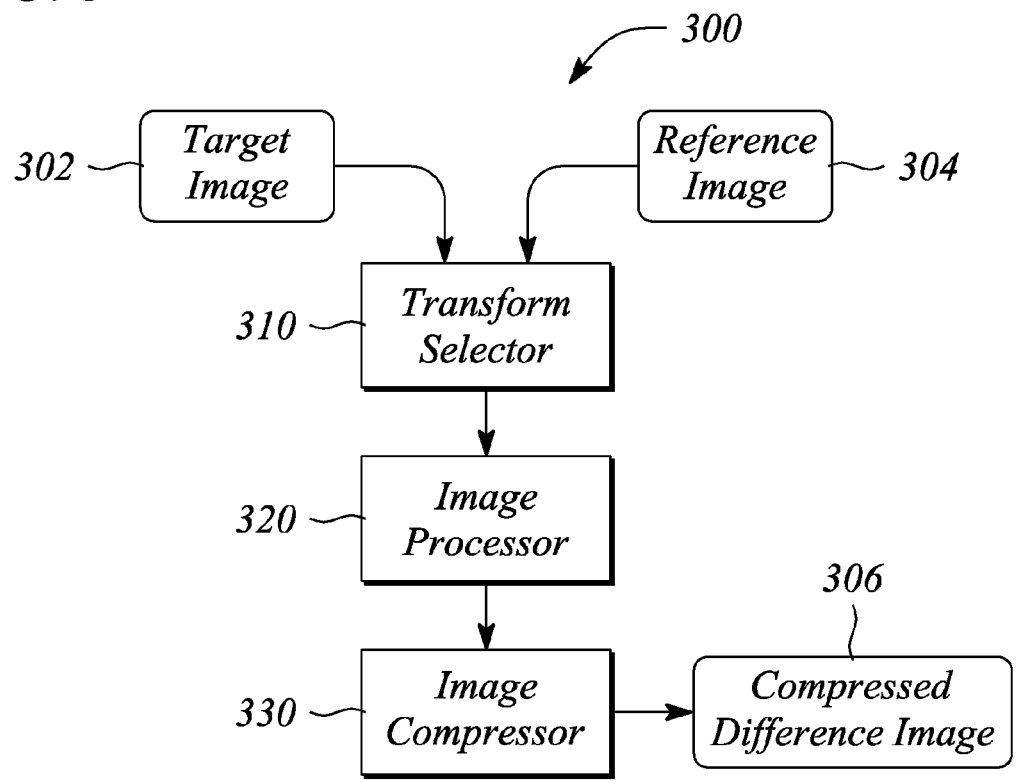
FIG. 4 illustrates a block diagram of a joint image compression system, according to another embodiment of the present invention.

FIG. 4 illustrates a block diagram of a joint image compression system 300, according to another embodiment of the present invention. The joint image compression system 300 accepts a target image 302 and a reference image 304. The joint image compression system 300 produces a compressed difference image 306 representing a difference between the target image 302 and the reference image 304.

The joint image compression system 300 illustrated in FIG. 4 comprises a transform selector 310. The transform selector 310 selects a selected transform that minimizes a cumulative mapping error (CME) for corresponding feature points in each of the target image 302 and the reference image 304 being processed by the joint image compression system 300. The transform selector 310 selects the selected transform from a plurality of transforms. In some embodiments, the plurality of transforms comprises a subset determined projective (SDP) transform computed from generally small subsets of corresponding feature points. In some embodiments, each SDP transform in the plurality of transforms is computed from a different, randomly selected subset of feature points. In some embodiments, the plurality of transforms further comprises an affine transform. In some embodiments, the transform selector 310 selects either the projective SDP transform or the affine transform depending on which one provides a smaller CME. In some embodiments, the transform selector 310 substantially implements selecting 110 a transform of the method 100 of joint image compression described above.

The joint image compression system 300 further comprises an image processor 320. The image processor 320 forms a difference image from the target image 302 and the reference image 304 using the selected transform. In some embodiments, the image processor 320 substantially implements forming 120 a difference image of the method 100 of joint image compression described above.

The joint image compression system 300 further comprises an image compressor 330. The image compressor 330 compresses the difference image to produce the compressed difference image 306. In some embodiments, the image compressor 330 also compresses one of the reference image and the target image. In some embodiments, the image compressor 330 further compresses transform parameters and associated information for the selected transform. In some embodiments, the image compressor 330 substantially implements compressing 140 the difference image of the method 100 of joint image compression described above.

In some embodiments, one or more of the transform selector 310, the image processor 320 and the image compressor 330 is implemented as a software program stored in a memory and executed by a processor of a computer. Specifically, the computer is configured by the software to be one of the transform selector 310, the image processor 320 and the image compressor 330 when a respective module or function of the software program is accessed from the memory and executed by the processor. For example, the respective module of the software program implements one of selecting a transform (i.e., transform selector 310), forming a difference image (i.e., image processor 320) and compressing an image (i.e., image compressor 330).

In some embodiments, one or more of the transform selector 310, the image processor 320 and the image compressor 330 is implemented using hardware. For example, the image processor 320 may comprise a specialized processor designed to efficiently process images (e.g., a graphics processor engine). Similarly, the image compressor 330 may be a specialized compression engine, for example. The hardware may comprise discrete logic, field programmable gate arrays (FPGAs), ASICs, and similar implementations, for example, according to various embodiments.

In some embodiments, the joint image compression system 300 may further comprise a feature extractor (not illustrated) that extracts feature points from each of the target image and the reference image. The feature extractor may further match the extracted feature points to identify the corresponding features. For example, the feature extractor may comprise hardware or software that implements SIFT. In some embodiments, the joint image compression system 300 further comprises a luminance compensator that compensates for luminance differences between the target image and the reference image under the selected transform. In various embodiments, the luminance compensator may be implemented using one or both of hardware and software. The hardware that implements one or both of SIFT and the luminance compensator may be any of a general purpose computer programmed (e.g., with software), a special-purpose processor (e.g., a graphics processor), an ASIC, an FPGA, or even discrete logic.

Thus, there have been described embodiments of a method of joint image compression and joint image compression systems that employ a difference image to remove redundancy from similar images for compression. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A joint image compression system comprising:
a computer readable media; and
a computer program stored on the computer readable media, the computer program comprising instructions that implement:
selecting a transform from among a plurality of transforms comprising a subset determined projective (SDP) transform, the selected transform minimizing a cumulative mapping error (CME) for corresponding feature points in each of a target image and a reference image;
applying the selected transform to one of the target image and the reference image;
forming a difference image under the selected transform; and
compressing the difference image to produce a compressed difference image.

2. The joint image compression system of claim 1, wherein the plurality of transforms comprises a plurality of SDP transforms, each SDP transform being computed using a different subset of randomly selected feature points, the selected transform being the SDP transform of the plurality of SDP transforms that yields a smallest CME.

3. The method of joint image compression of claim 2, wherein the different subsets of randomly selected feature points each comprises four feature points.

4. The joint image compression system of claim 1, wherein the plurality of transforms further comprises an affine transform that minimizes the CME, and wherein selecting a transform comprises selecting either the SDP transform or the affine transform depending on which one provides a smaller CME.

5. The joint image compression system of claim 1, wherein forming the difference image under the selected transform comprises computing the difference between the target image and the reference image transformed according to the selected transform.

6. The joint image compression system of claim 1, wherein the computer program further comprises instructions that implement both compressing parameters of the selected transform and associating the compressed parameters with the compressed difference image.

7. The joint image compression system of claim 1, wherein the computer program further comprises instructions that implement performing luminance compensation of the target image and the reference image under the selected transform, wherein luminance compensation is performed prior to forming the difference image.

8. The joint image compression system of claim 1, wherein the computer program further comprises instructions that implement performing local adjustment of the selected transform.

9. The joint image compression system of claim 1, wherein the computer program further comprises instructions that implement both extracting feature points and matching the extracted feature points to locate and identify corresponding feature points in each of the target image and the reference image.

10. The joint image compression system of claim 1, further comprising a computer that reads the computer readable media and executes the computer program.

11. A joint image compression system comprising:
a transform selector that selects from a plurality of transforms a selected transform that minimizes a cumulative mapping error for corresponding feature points in each of a target image and a reference image being processed by the joint image compression system, the plurality of transforms comprising a subset determined projective (SDP) transform and an affine transform;
an image processor that forms a difference image from the target image and the reference image under the selected transform; and
an image compressor that compresses the difference image to produce a compressed difference image,
wherein the transform selector selects either the SDP transform or the affine transform depending on which one provides a smaller CME.

12. The joint image compression system of claim 11, wherein the plurality of transforms comprises a plurality of SDP transforms, each SDP transform being computed from a different subset of four randomly selected feature points.

13. The joint image compression system of claim 11, further comprising:
a feature extractor that extracts feature points from each of the target image and the reference image and that further matches the extracted feature points to identify the corresponding feature points; and
a luminance compensator that compensates for luminance differences between the target image and the reference image under the selected transform.

14. A method of joint compression of similar images, the method comprising:

providing a reference image and a target image from an image capture device;

determining parameters of a plurality of subset determined projective (SDP) transforms that minimize a cumulative mapping error (CME) of corresponding feature points in each of the reference image and the target image, an SDP transform of the plurality being identified having a smallest CME;

determining parameters of an affine transform that minimizes the CME for the corresponding feature points;

selecting as a selected transform either the identified SDP transform or the affine transform depending on which of the identified SDP transform and the affine transform has a smallest CME; and compressing a difference image formed by an image processor using an image compressor, the difference image being formed from a difference between the target image and the reference image under the selected transform.

15. The method of joint compression of similar images of claim 14, further comprising:

extracting feature points from the reference image and the target image;

identifying the corresponding feature points in each of the reference image and the target image;

performing luminance compensation of the target image and the reference image under the selected transform before compressing the difference image; and performing local adjustment of the selected transform.

\* \* \* \* \*